United States Patent [19]

Huguenin

[11] Patent Number: 4,940,986
[45] Date of Patent: Jul. 10, 1990

[54] MILLIMETER WAVE LOCATING

[75] Inventor: George R. Huguenin, South Deerfield, Mass.

[73] Assignee: Millitech Corporation, Mass.

[21] Appl. No.: 874,461

[22] Filed: Jun. 16, 1986

[51] Int. Cl.$^5$ .................. G01S 1/16; G01S 13/00
[52] U.S. Cl. ........................... 342/410; 342/33
[58] Field of Search .................. 342/410–412, 342/33–35, 53; 364/425, 429; 340/955

[56] References Cited

U.S. PATENT DOCUMENTS

| | | | |
|---|---|---|---|
| 3,840,877 | 10/1974 | Crane | 342/410 |
| 3,971,025 | 7/1976 | Levine | 342/410 |
| 3,986,153 | 10/1976 | Kuno et al. | 333/236 |
| 4,317,119 | 2/1982 | Alvarez | 342/455 |
| 4,385,354 | 5/1983 | Hornfeld et al. | 364/429 |

OTHER PUBLICATIONS

Introduction to Radar Systems, Sec. Ed., Skolnik, ©1980, pp. 7–8 and 560–561.
Introduction to Electronic Warfare, Schleher, ©1986, pp. 284–291.

Primary Examiner—Gregory C. Issing
Attorney, Agent, or Firm—Pennie & Edmonds

[57] ABSTRACT

A system for landing aircraft during low visibility includes a number of millimeter wave sources in or near the runway light housings radiating millimeter wave beams along the runway. An airborne millimeter wave camera includes a millimeter wave lens that focuses the image of the millimeter wave sources upon a hemispherical detector array that provides signals processed to create an image of the millimeter wave sources corresponding substantially to the visible image perceived by a landing pilot when observing the runway light pattern during good visibility conditions.

8 Claims, 6 Drawing Sheets

RANGE: 5000 FT.

RANGE: 2000 FT.

RANGE: 1000 FT.

RANGE: 500 FT.

RANGE: 200 FT.

RANGE: 100 FT.

RANGE: 0 FT.

MILLIMETER WAVE LOCATING

The present invention relates in general to locating and more particularly concerns novel apparatus and techniques for providing information on the location of relevant areas, such as an airport runway, especially useful under conditions of low visibility, such as to a landing aircraft. The invention provides an economical and reliable system capable of displaying the information in a form that facilitates reliable action thereon with relatively little training.

There are a number of approaches for guiding aircraft to a safe landing under conditions of low visibility. In a ground controlled approach (GCA) or precision approach radar (PAR) system, a radar system having the scanning antennas located near the runway, scan the approach path in both azimuth and elevation. An echo from the approaching aircraft is displayed on a cathode ray tube in both elevation and azimuth relative to the desired landing path. A ground operator instructs the pilot by voice of the aircraft position relative to the desired glide path to allow the pilot to adjust the aircraft position to coincide with the desired landing path. While this system works well, it is costly, has limited landing capacity, requires essentially continuous access to a voice communications channel and effectively provides only one acceptable landing approach path.

The most commonly used approach is the instrument landing system (ILS). In an ILS, antennas near the runway radiate a localizer beam at a VHF frequency to provide left-right guidance and a glide slope signal at UHF to provide up-down guidance. Receivers in the aircraft convert the localizer and glide slope signals into meter pointer deflection signals that center vertical and horizontal crossed pointers when the aircraft is on the desired landing path. Pointer deflection from the center position indicates the direction in which the pilot must fly the aircraft to return to the desired landing path. While this system is reliable and safe, it is authorized for use within specified minimums of visibility and ceiling. Furthermore, the ILS provides only one acceptable landing path.

A more recent approach is the microwave landing system (MLS). A microwave landing system provides a number of acceptable landing paths, it requires antennas near the runway scanning the approach region, and microwave receiving equipment in the aircraft for decoding the transmitted information and converting it into an instrumented display significantly different from what the pilot sees when making a visual approach. Thus, in a microwave landing system approach and a conventional instrument landing system approach, it is customary for one of the pilots to control the landing aircraft until the runway becomes visible. The other pilot then assumes control and lands the aircraft visually.

Another approach disclosed in U.S. Pat. No. 3,122,742 uses a remote lens that focuses microwave energy on an array of receiving antennas, each of which detect microwave energy focused thereon to illuminate an electroluminescent panel so that an observer may obtain an indication of the position of the microwave source from the display panel. U.S. Pat. No. 3,089,139 describes a similar arrangement in a proximity warning system.

It is an important object of this invention to provide an improved locating system.

According to the invention, there is millimeter wave transmitting means located at the area to be located for radiating a locating beam of millimeter wave energy. At a remote location there is millimeter wave camera means for providing a visible representation of the image of the millimeter wave transmitting means. The millimeter wave receiving means includes lens means for focusing an image of millimeter wave transmitting means upon a camera focal surface having a detector array. Means are provided for scanning the focal surface detector array and providing signals representative of the images of the millimeter wave sources as seen through the lens means and corresponding substantially to the visible image seen of visible light sources, such as runway landing lights, at the same location as respective millimeter wave sources.

Numerous other features, objects and advantages of the invention will become apparent from the following specification when read in connection with the accompanying drawing in which.

Figure 1:
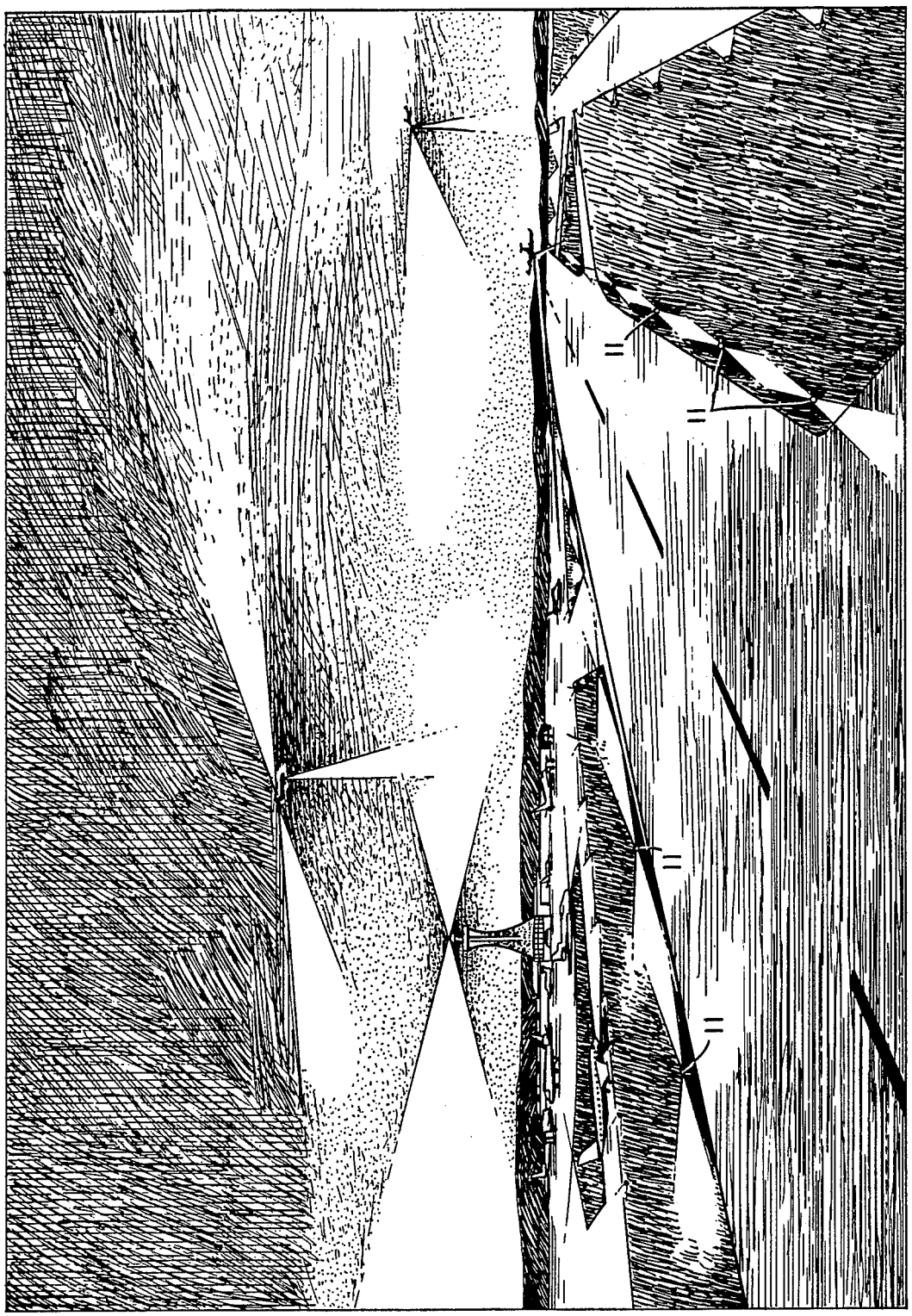
FIG. 1 is a pictorial representation of a millimeter wave system according to the invention.
Figure 4:
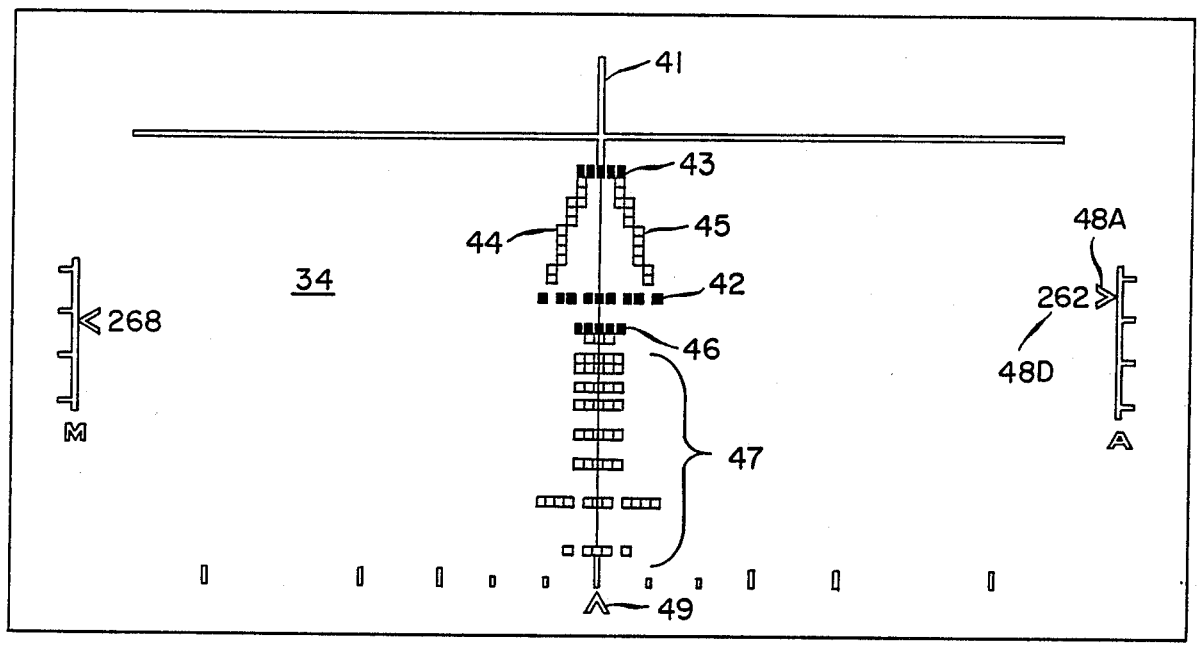
Figure 5:
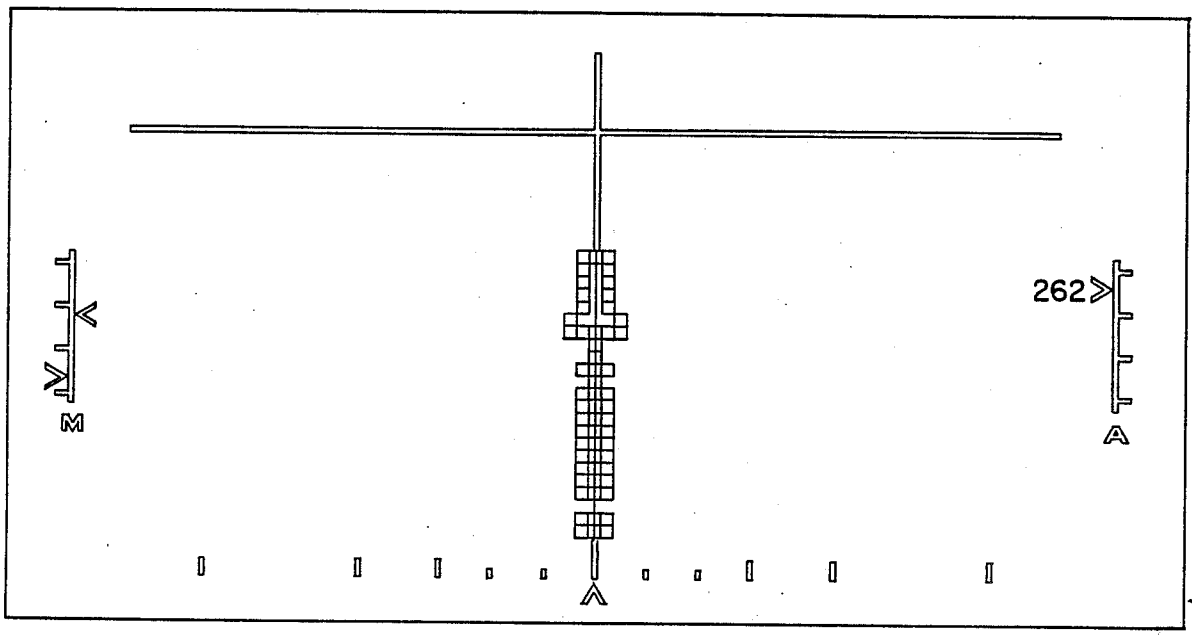
Figure 6:
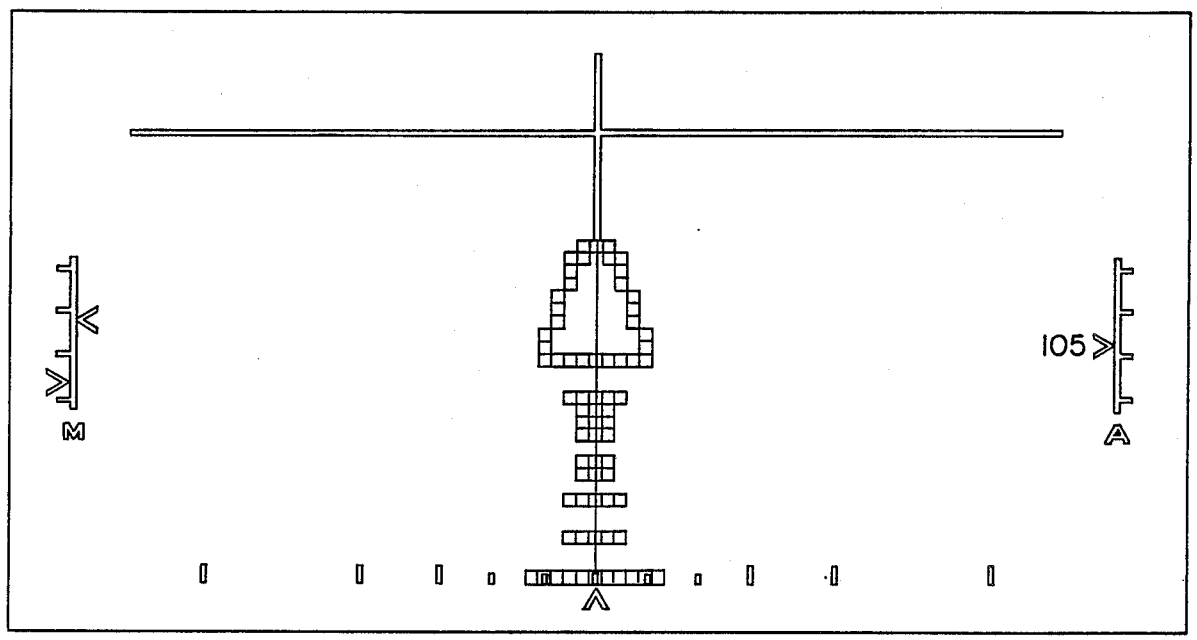
Figure 7:
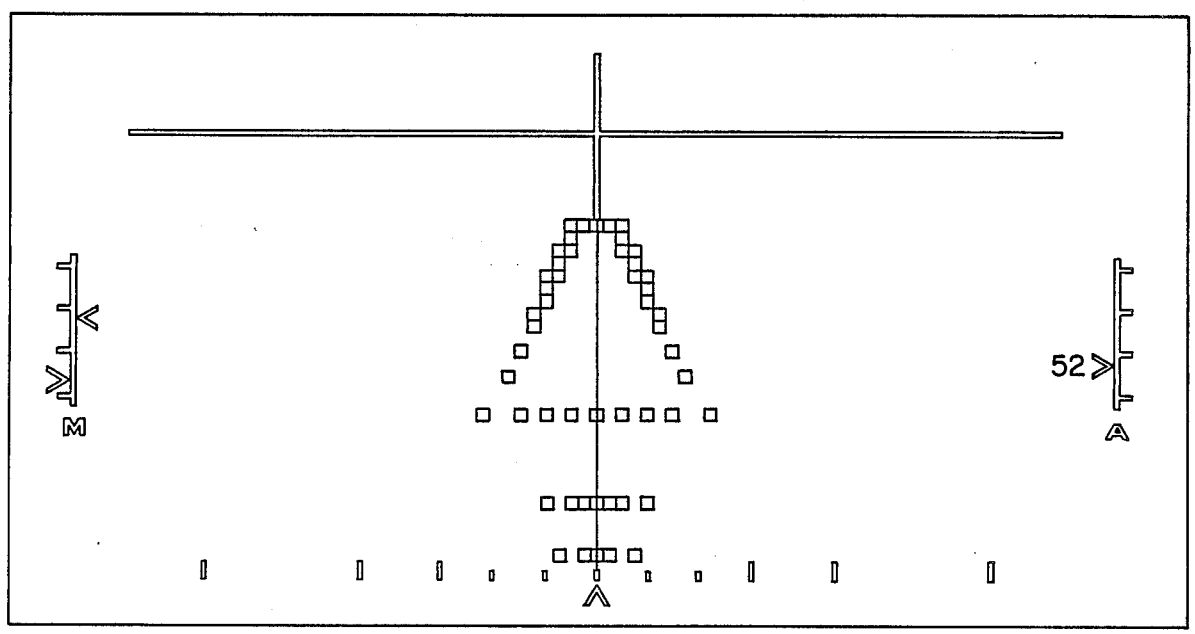
Figure 8:
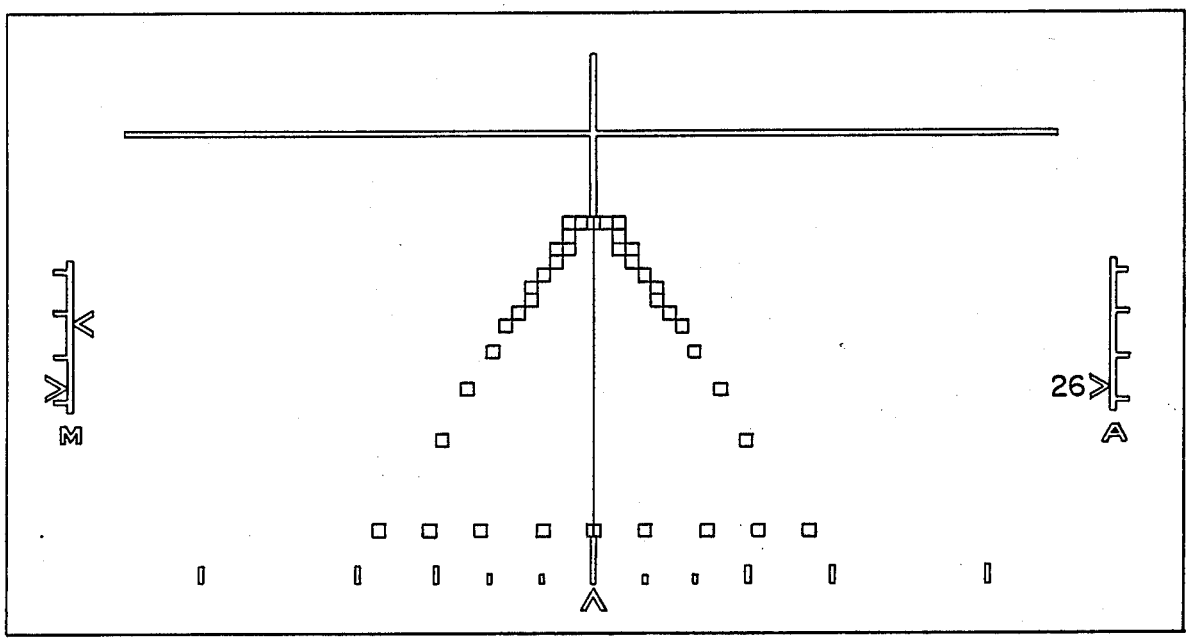
Figure 9:
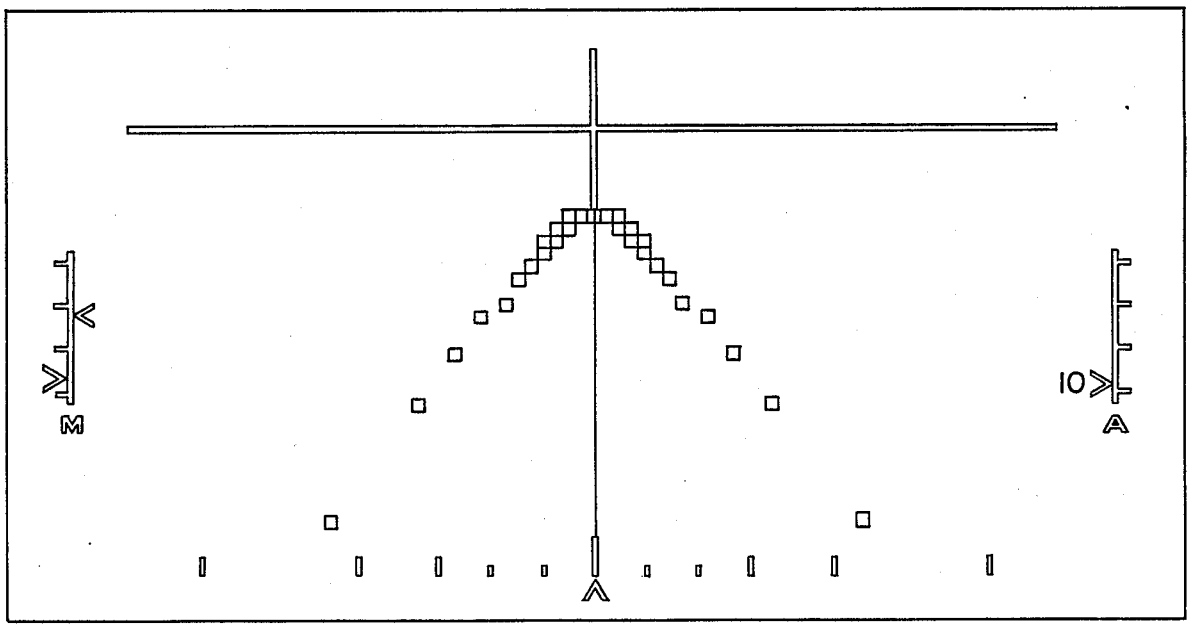
Figure 10:
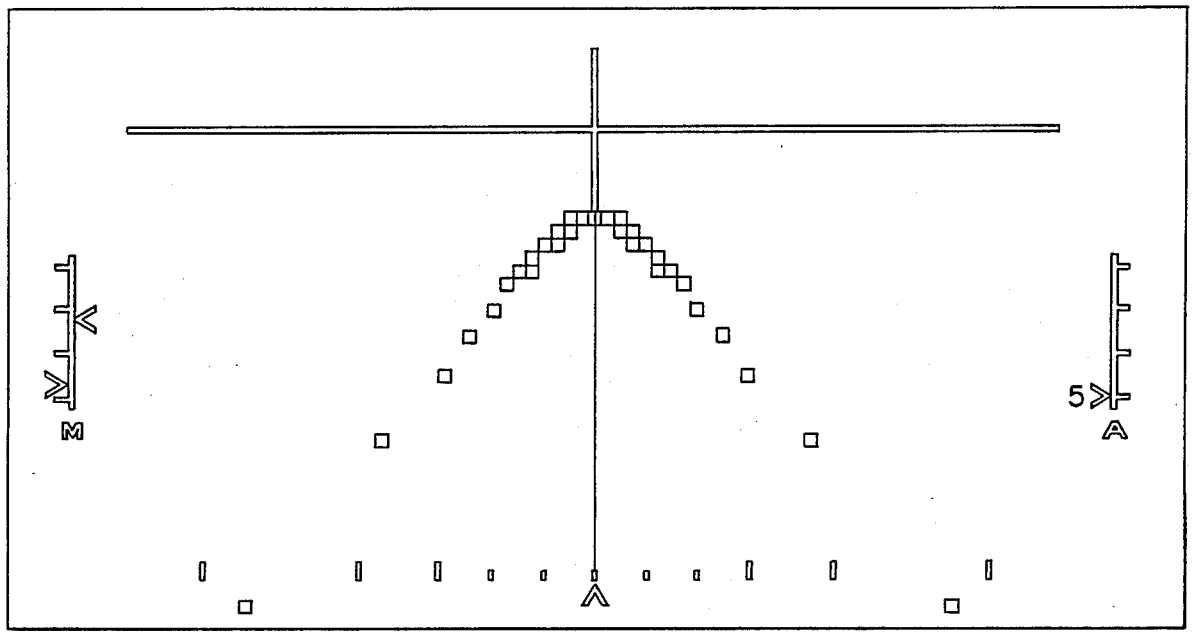
Figure 11:
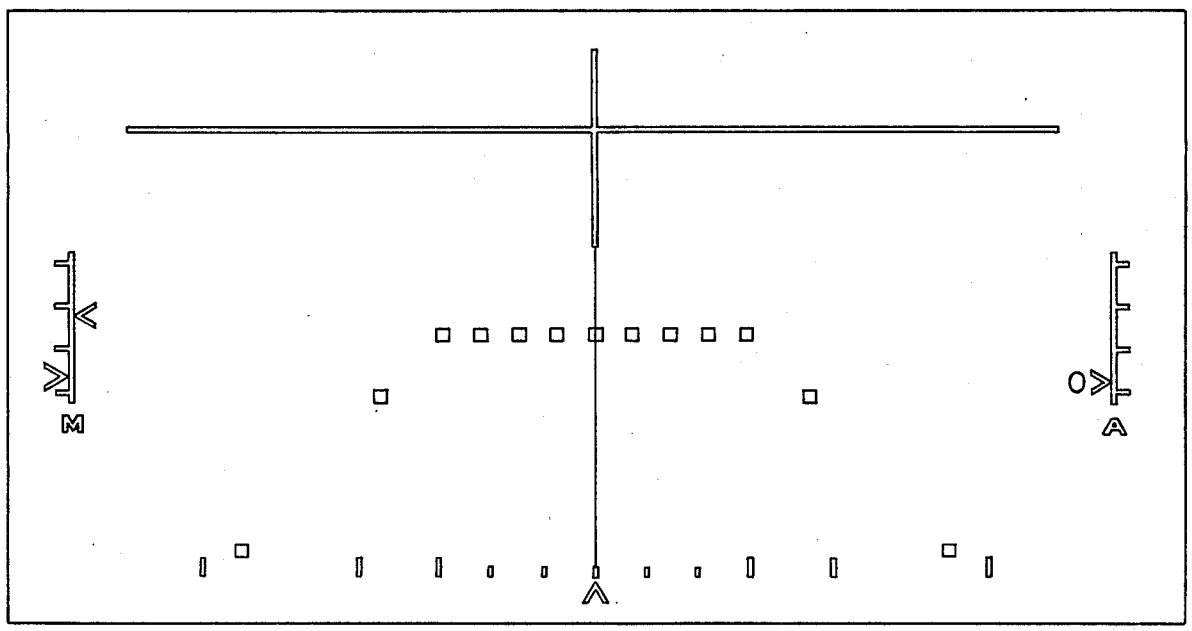

FIG. 4 is a pictorial representation of a head-up display seen by a pilot in a cockpit; and FIGS. 5-11 are pictorial representations of typical displays seen by a pilot upon landing at ranges of 5,000, 2,000, 1,000, 500, 200, 100 and 0 feet from touchdown, respectively, With reference now to the drawing and more particularly FIG. 1 thereof, there is shown a pictorial representation of an exemplary embodiment of the invention for facilitating landing aircraft under zero visibility conditions. The runway landing lights 11 each include a millimeter wave source radiating millimeter wave energy into the area around the runway. A millimeter wave television-like camera 12 on each aircraft provides a head-up display (HUD) presenting the runway light pattern in substantially the same form as seen by the pilot while observing the visible lights during a visible approach at corresponding distances.

Figure 2:
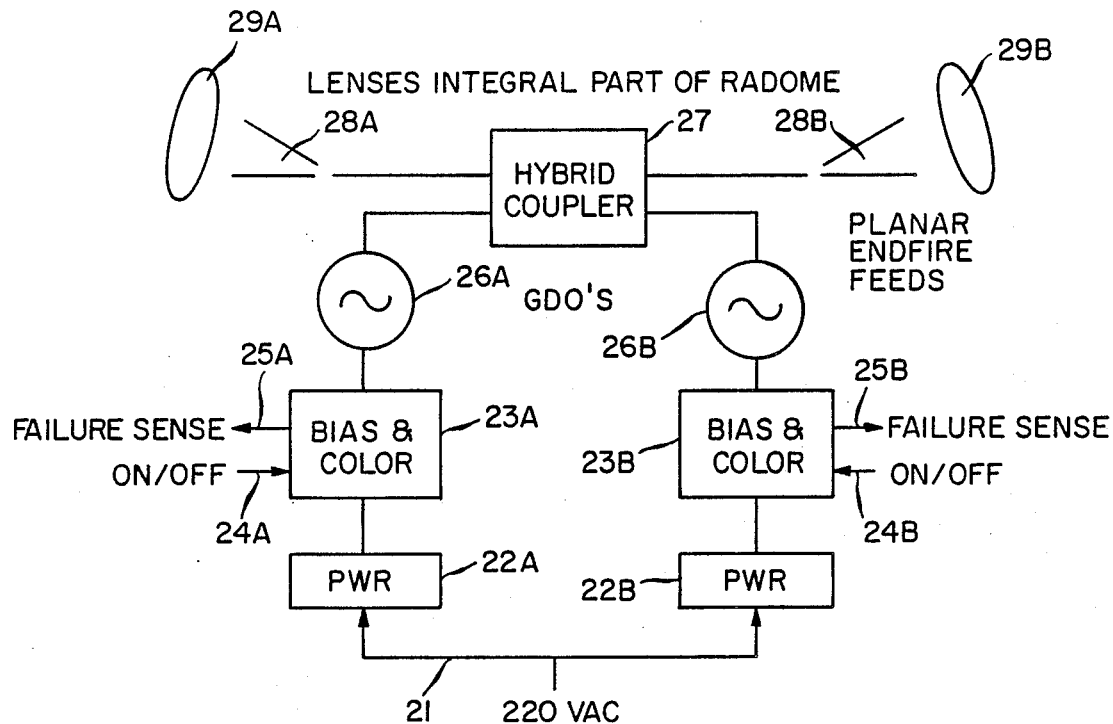
FIG. 2 is a block diagram of a system for providing millimeter wave energy at the location of visible light sources.

Referring to FIG. 2, there is shown a block-diagrammatic representation of a millimeter wave source suitable for being placed at an area to be located, such as in a runway, taxiway or approach light. This preferred form of the invention is duplicated to provide redundancy and insure millimeter wave illumination from the area so long as one of the two redundant channels is operative. The 220-volt A.C. line source present in a runway light on line 21 energizes power supplies 22A and 22B that provide power to biasing and modulating signal sources 23A and 23B. Each of the latter sources receives an enabling signal on lines 24A and 24B that may represent both a signal to radiate millimeter wave energy and modulated with a particular low frequency representative of a particular color corresponding to an associated visible light. For example, runway lights along the side are typically white or amber, a row at the beginning of the runway is typically green and rows at the far ends of the approach lights and runway are typically red. The biasing and modulating signal sources 23A and 23B may also include failure sense terminals 25A and 25B, respectively, for providing signals representative of an oscillator or a power failure.

Sources 23A and 23B enable and modulate Gunn diode oscillators 26A and 26B, respectively. The outputs of oscillators 26A and 26B are applied to respective inputs of hybrid coupler 27 that combines their outputs and energizes planar feeds 28A and 28B which radiate energy through millimeter wave lenses 29A and 29B that preferably form part of the protective radome, which may be transparent, to also allow an associated runway light bulb to be visible through it if necessary. With this arrangement both endfire radiators 28A and 28B emit millimeter wave energy through lenses 29A and 29B, respectively, as long as one of the two channels is operative.

For runway lights there are preferably two 10° beamwidth (full-width half-maximum [FWHM]) conical beams centered on a 3° elevation beamed in opposite directions along the runway axis using modulations corresponding to white for runway edge lights, red for runway far end lights and green for threshold lights with horizontal linear polarization. Gunn diode oscillators 26A and 26B preferably each produce 30 milliwatts of power at 96 GHz combined through hybrid coupler 27 to produce two redundant feed ports with a total power 15 dBm. Planar endfire radiators 28A and 28B with lenses 29A and 29B integral in the radome produce the desired beams with gain $= +24.5$ dBi. The physical size of the package may be $3'' \times 3'' \times 6''$.

For approach lights, there may be one 10° beamwidth (FWHM) conical beam centered on a 3° elevation and oriented along the approach axis with the modulation corresponding to white along the center line and red for the last row of approach lights using horizontal linear polarization. Two Gunn diode oscillators 26A and 26B each producing 30 milliwatts of power are preferably combined to produce a single port with power $P_T = +18$ dBm. A planar endfire radiator with integral lens/radome produces the desired beam with $G = +24.5$ dBi. This assembly may fit within a 3" cube. The approach millimeter wave sources may be strobed in synchronism with the strobing of corresponding visible lights.

For taxi lights, it is preferred that the beam be broad, nearly hemispherical, with horizontal linear polarization and modulated to represent the color blue. A single Gunn diode oscillator may produce 10 milliwatts of power for a $P_T = +10$ dBm. The antenna may comprise a broadside planar bowtie with spherical hemispheric radome cover and fit within a $3'' \times 3'' \times 6''$ enclosure.

Figure 3:
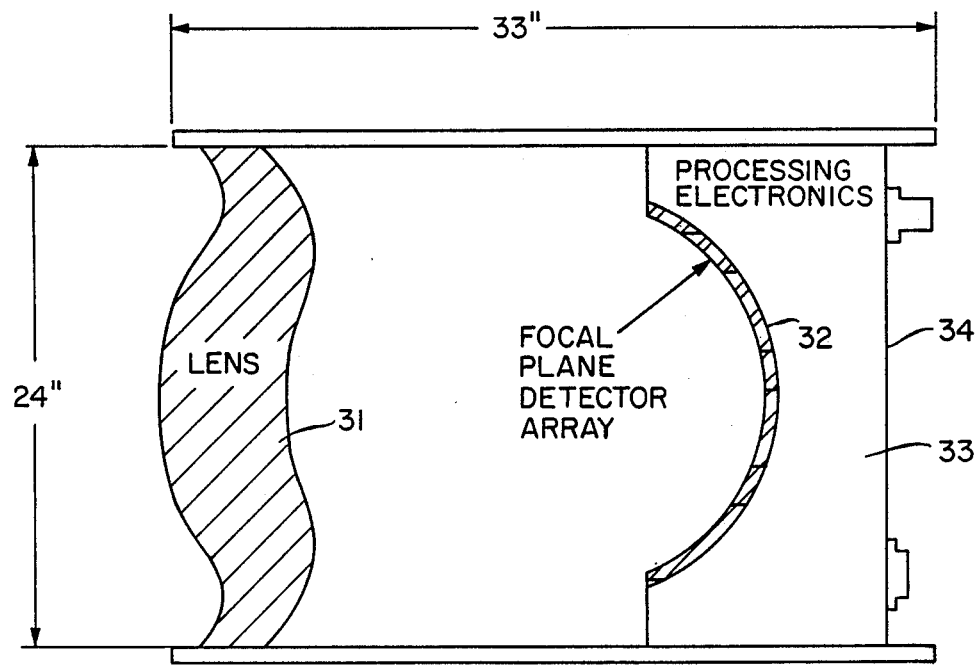
FIG. 3 is diagrammatic representation of a camera according to the invention.

Referring to FIG. 3, there is shown a diagrammatic representation of the aircraft camera optics. The millimeter wave camera 12 includes a circularly symmetrical lens 31 that focuses an image of the ground millimeter wave sources on hemispherical detector array 32 in the focal surface of lens 31. Processing electronics 33 may provide a display on display surface 34 showing the images of the millimeter wave sources on the ground in the same relationship as their respective visible counterparts would be seen on a visible approach.

The system may also include a high resolution radar altimeter of known type for accurately displaying height of the landing gear above ground between 0 and 250 feet with one and a half foot accuracy. The height may be conveniently displayed in both analog and digital form on display 34 together with the image of the runway and approach lights to facilitate smooth touchdown. The specific means for implementing such an altimeter and displaying its output is known in the art and will not be described in detail herein to avoid obscuring the principles of the invention.

Electronic processing unit 33 may be powered from the aircraft 28-volt D.C. bus. Signal processing circuitry of known type may receive the multiplexed output of the focal plane detector array 32 and provide it in a form for display on display surface 34 or for processing in a control system, such as for automatic landing, in accordance with known techniques. The millimeter wave altimeter output may be processed in accordance with known techniques with processing electronics unit 33 for display on the display surface 34 or processing in a control system.

Referring to FIG. 4, there is shown a pictorial representation of the display seen by a landing pilot on display surface 34. The display may generate a line 41 corresponding to the runway center line. This line may be referenced to a fixed datum line on the display surface which corresponds to an extension of the aircraft's longitudinal axis. The runway threshold is represented by the row of green lights 42 and the end of the runway by the row of red lights 43 with left and right rows of lights 44 and 45 corresponding to the image of the lights aligned along the left and right sides of the runway, respectively. The red row of lights 46 represents the last row of approach lights and the rows of lights 47 represent the image of the approach lights, which may be stobed in synchronism with the strobing of the visible approach lights so that the illustrated display corresponds to the visible image of the approach and runway lights perceived by a pilot while landing under visible conditions at the contemporary position of the aircraft.

The display surface 34 may include at one side a digital representation 48D and an analog representation 48A of the aircraft altitude and a velocity representation 48E at the other side. The display may also provide an analog indication 49 of the aircraft position relative to the runway center line 41.

It may also be advantageous to include millimeter wave signal sources on the aircraft near the landing lights for illuminating the runway in a manner analogous to conventional aircraft landing lights. The millimeter wave camera 12 will pick up and display the millimeter wave emissions backscattered from surface irregularities in the runway, such as potholes and debris. They may typically be single beam illuminators of white color having a symmetrical beam of 15° beamwidth (FWHM) radiating 100 milliwatts (+20 dBm) to provide a signal to noise ratio of 11 dB for 1% backscatter at 500 feet and fit within a package substantially $2'' \times 2'' \times 6''$. Still further, millimeter wave sources may be located with the navigation lights modulated to have the same color as the visible navigation lights to provide information to other aircraft equipped with a millimeter wave camera according to the invention.

The invention may be used to provide a pilot with necessary information in visible form and in a familiar visible pattern to land, taxi and take off under zero visibility conditions caused by fog, blowing snow, rain, smoke or dust. During a landing approach the millimeter wave camera 12 may acquire the airport lights of the order of 10,000 feet from the runway. Prior to that time, the pilot may use existing navigational and approach aids, such as ILS. Thereafter the pilot may use the invention in combination with existing on-board instrumentation and his professional experience and instincts developed in clear-weather night landings in which the visibly observable pattern is substantially the same as that displayed on display surface 34.

Referring to FIGS. 5-11, there are shown typical images displayed at ranges of 5,000, 2,000, 1,000, 500, 200, 100 and 0 feet, respectively. Note that at 5,000 feet the image of the lights bordering the runway are parallel while the lights at the approach end gradually diverge as the aircraft approaches, analogous to what the pilot would observe while making a night landing visibly.

Under worst weather conditions at maximum range of 10,000 feet, the signal-to-noise ratio is substantially 13 dB (20:1) and is substantially 20 dB (100:1) under typical fog or blowing snow conditions. The signal-to-noise ratio continually improves and at 5,000 feet is between 100:1 and 400:1, providing excellent signals, even under the poorest weather conditions.

When using millimeter wave sources on the aircraft for illuminating the runway analogous to landing lights, hazards become visible at the 1,500 foot range, and the runway surface generally becomes visible at 500 feet.

The field of view and pixel size are preferably selected to give a reasonably detailed image of the airport runway during landing. The field of view is typically 32 arc-degrees in azimuth and 16 arc-degrees in elevation with an aperture of 24 inches and an angular resolution of 20 arc-minutes with 96×48 pixels for a total of 4,608. Sensitivity is as good as −75 dBm noise floor. The millimeter wave receiver includes Gaussian optics lens antenna cylinder 24" in diameter ×33" long capable of displaying white, red, blue, green and amber. A tertiary level system is adequate with off less than −65 dBm, low at −65 dBm and high at −50 dBm, using a three-bit output pixel capable of assuming five colors and three levels.

While the invention has been described in connection with an aircraft landing system, the principles of the invention may be used for ground navigation along taxiways, may be used in collision avoidance systems and may be used by ground observation millimeter wave cameras for locating aircraft or other vehicles. The invention may also be used for water navigation by associating millimeter wave sources with channel marking lights and navigational lights in a manner similar to that described in connection with aviation.

It is evident that those skilled in the art may now make numerous other uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Area locating apparatus comprising,
   millimeter wave source means at an area to be located for radiating millimeter wave energy that penetrates fog and blowing snow,
   and millimeter wave camera means remote from said area responsive to said millimeter wave energy for providing a location signal representative of the location of said millimeter wave source means.

2. Locating apparatus in accordance with claim 1 wherein said millimeter wave source means comprises,
   a plurality of millimeter wave sources defining said area to be located therebetween.

3. Locating apparatus in accordance with claim 2 wherein said area includes a pattern of visible lights,
   said millimeter wave sources being located near respective ones of said visible lights,
   whereby said millimeter wave camera means provides location signals analogous to the image visibly perceived by an observer of said visible lights under conditions of good visibility.

4. Locating apparatus in accordance with claim 3 wherein said millimeter wave sources are located relative to an airport runway and comprise means for outlining said runway to provide location signals usable by an aircraft for safely landing the aircraft during conditions of low visibility,
   said millimeter wave camera means being located on said aircraft.

5. Locating apparatus in accordance with claim 2 wherein said area includes airport structures,
   said millimeter wave sources being located on said airport structures to facilitate avoidance of said structures during conditions of low visibility.

6. Locating apparatus in accordance with claim 5 wherein said millimeter wave camera means is located on a vehicle movable along said airport for assisting the operator of said vehicle in determining the location of said airport structures during conditions of low visibility.

7. Locating apparatus in accordance with claim 1 wherein said millimeter wave camera means is on a vehicle movable around an airport for helping the operator of said vehicle in locating said area.

8. Locating apparatus in accordance with claim 7 wherein said millimeter wave camera means is installed on ground vehicles.

* * * * *